United States Patent [19]

Zerfahs et al.

[11] Patent Number: 5,089,694
[45] Date of Patent: Feb. 18, 1992

[54] CARD READER DEVICE HAVING AUTOMATIC MEANS FOR CLAMPING THE CARD TO BE READ AND FOR AUTOMATICALLY EJECTING THE CARD AT THE END OF THE CARD READING AND WRITING OPERATIONS

[75] Inventors: Arthur S. Zerfahs, Elk Grove Village; Kirk D. Hoffman, Yorkville; Norman Diamond, Deerfield, all of Ill.

[73] Assignee: General Signal Corporation, Stamford, Conn.

[21] Appl. No.: 489,805

[22] Filed: Mar. 7, 1990

[51] Int. Cl.⁵ .............................................. G06K 7/00
[52] U.S. Cl. ..................................... 235/486; 235/449; 360/2
[58] Field of Search .................... 235/449, 486, 475; 360/2; 346/76 PH

[56] References Cited

U.S. PATENT DOCUMENTS 4,087,680  5/1978  Mack et al. ........................ 235/449
4,151,564  4/1979  Schreiber et al. ............... 235/449 X
4,240,030  12/1980  Bateman et al. ................. 235/449 X
4,376,942  3/1983  Toth et al. ....................... 346/76 PH
4,527,052  7/1985  Kilborn .......................... 235/475 X

*Primary Examiner*—David Trafton
*Attorney, Agent, or Firm*—Robert R. Hubbard; John F. Ohlandt

[57] ABSTRACT

A card reader system for reading a fare card containing data, the card being adapted for insertion into the reader; the operation is such that the card is held in a fixed position while it is being read and while other operations such as erase, write, and the like are being performed. The reader assembly is moved past the card to read the data and perform the other operations and the data representative of the amount of fare already paid is stored and a balance due or remaining is calculated and is written on the card. Preferably, the card has a magnetic stripe carrying the data, and the reader includes a magnetic head, as well as an optional thermal (marking) head. Solenoids are used to clamp in the fixed position and to eject the card after clamping is released.

7 Claims, 6 Drawing Sheets

CARD READER DEVICE HAVING AUTOMATIC MEANS FOR CLAMPING THE CARD TO BE READ AND FOR AUTOMATICALLY EJECTING THE CARD AT THE END OF THE CARD READING AND WRITING OPERATIONS

BACKGROUND OF THE INVENTION

The present invention relates to a fare card reader device or system, and more particularly to a device in which the card is held in fixed position while a variety of operations such as read, write, erase, and verify are performed.

It has been known in the art to provide a variety of schemes or devices for reading fare cards and to perform certain operations in connection therewith. For example, one known device involves the reading of a fare card according to which the card itself is moved or "swiped" relative to a fixed reader assembly. However, the device functions thusly merely to provide the read operation and is incapable of performing other desired operations such as erasing the information already read and rewriting new data or information onto the card.

SUMMARY OF THE INVENTION

A fundamental object of the present invention is to provide an efficient fare card reader that will perform a complete repertoire of functional operations with respect to a fare card adapted to be inserted into the reader.

Another object of the present invention is to package the entire reader system in a small enclosure which may be mounted to an existing farebox or similar equipment.

Yet another object is to provide a motor driven transport as part of the reader system, which transport shall enable efficient reading, writing, and marking of specially prepared magnetic striped cards.

Another object is to provide as an optional feature a thermal head as part of the reader assembly, thereby to permit making a mark or printing on heat sensitive material provided as an additional stripe on the fare card.

The above and other objects are achieved by the primary feature of the invention whereby a fare card containing data is adapted to be inserted into a reader assembly, the fare card being automatically clamped in a fixed position responsive to the insertion of the card, and the fare card being written into and the writing verified by automatic operation in accordance with logic controls that are established. Such controls also direct the movement of the reader head in a predetermined direction as the reading operation is performed. Furthermore, they return the reader head; then move the reader head in the read direction to write new data onto the card, and then move the reader head in the reverse direction to re-read or verify the written data or information.

Viewed as a total combination, the card reader system comprises: a fare card, which contains data adapted to be inserted into the reader device; means for clamping the card in a fixed position automatically responsive to the insertion of the card so that the card may be read and other operations performed with respect to it; a card reader assembly; means for moving said card reader assembly past the card to read the data on the card, to write new data and to verify that the new data has been correctly written; and means for transmitting the data representative of a fare amount.

In accordance with a subordinate feature of the present invention which may optionally be employed, a thermal material, which is initially white, is turned black with the contact of a heated print head, whereby the card is marked or printed to indicate that the amount of fare has been verified. Another subordinate feature of the present invention resides in the provision of a special means of ejecting the fare card at the end of a complete operation.

Other and further objects, advantages and features of the present invention will be understood by reference to the following specification in conjunction with the annexed drawing, wherein like parts have been given like numbers.

DESCRIPTION OF PREFERRED EMBODIMENT

Figure 1:
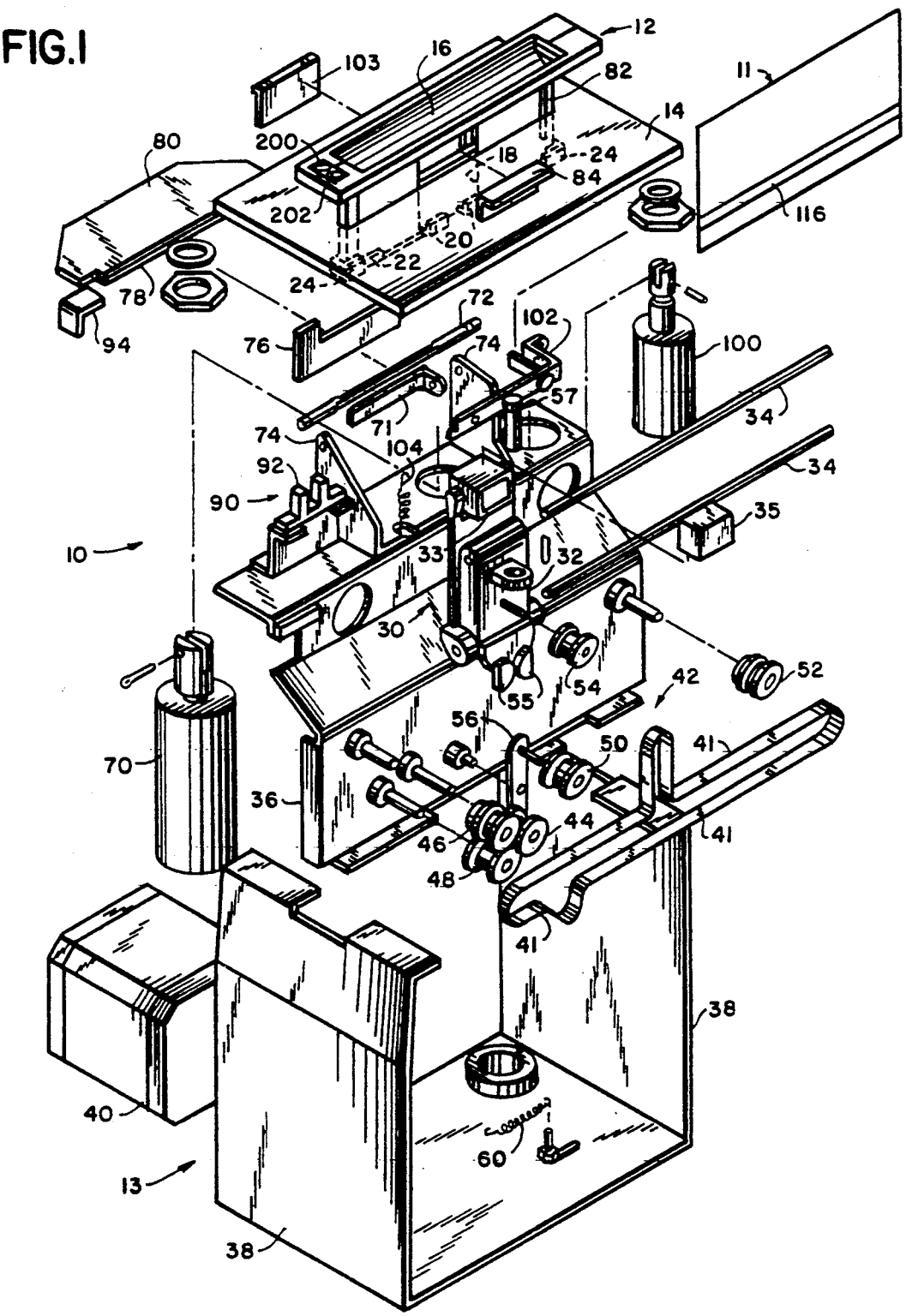
FIG. 1 is an exploded view of the reader system in accordance with a preferred embodiment of the present invention.

Referring now to the figures of the drawing and particularly, for the moment, to FIG. 1, there will be seen an exploded view of the card reader device 10 in a preferred embodiment.

A card 11 is adapted to be inserted in a plastic bezel 12, composed of nylon or similar material, which is fitted at the top of a metal housing 13 in operative relationship with a similarly composed plastic top plate 14. The bezel 12 has downwardly sloping inner surfaces to define an opening 16 for the card 11.

When the card 11 is inserted into the opening 16, it extends downwardly inside the housing to reach a movable stop mechanism 18 having a pair of spaced stops 20 thereon. A further pair of fixed stops 22 are also located inside the housing to be adjacent the corners of card 11 when the card has been inserted. The fixed stops 22 contrast with the stops 20 formed on the stop mechanism 18, since the mechanism 18 is adapted to be moved up and down depending on the position to be assumed by the card.

It will be noted that adjacent the respective fixed stops 22 are optical sensors or switches 24 for purposes to be explained. The stops 20 and 22, and sensors 24 are configured to define slots, so as to permit passage for the lower edge of the card 11.

For the purpose of reading the card 11 once it has been inserted into the bezel 12, a reader assembly 30 is disposed within the housing 13 of device 10. The reader assembly 30 includes a carriage 32 adapted to be transported along spaced rods 34 whose opposite ends are affixed at suitably spaced locations within openings in plates 36 attached to inner sides of opposite walls 38 of housing 13.

The entire reader assembly 30 is controlled in its movements, that is, selectively provided with motive power, by means of a stepper motor 40 mechanically connected through a toothed belt 41 and pulley assembly 42 to reader assembly 30. This assembly 42 includes a driven pulley 44, which is directly driven by the stepper motor 40, a series of idler pulleys 46, 48, 50, and 52, and a fixed pulley 54 mounted on carriage 32 so that the pulley 54 cannot turn. The upper portion of belt 41 is guided by guide 55 around pulley 54, being variably held against said pulley by set screw 57. In conventional manner, for "take-up" purposes, pulley 50 is mounted on a pivotable plate 56 and is spring biased by means of a spring 60.

The means for clamping the fare card 11 in position when it is inserted internally of the current reader device includes, in a preferred form, solenoid 70 which is operative when energized, by dint of link 71, to cause rod 72, which is suitably journaled at its ends in the respective plates 74, to rotate, thereby causing the upper end of a plate 76 to force the forward edge 78 of clamping device 80 against the rear face of card 11. Since card 11 when inserted is limited in its movement by reason of the guide 82 along the side edge of the card and because of the further guide means 84 situated just below the lower surface of plastic plate 14, the card 11 will be held or clamped firmly in position.

A sensor arrangement 90, made up of slotted sensor 92, gives positive indication to the microcontroller that the clamping action has taken place An ejection solenoid is operative to cause ejection of the fare card from the bezel 12. This solenoid is rendered operative at the end of the card reading cycles such that a link 102, connected to the upper end of the solenoid 100, functions to lift a plate 103 to which is connected the movable stop mechanism 18 carrying the stops 20 against which the card rests. It will be appreciated that the link 102 is moved upwardly against a spring bias provided by the spring 104 connected to the distal end of the link 102.

Figure 8:
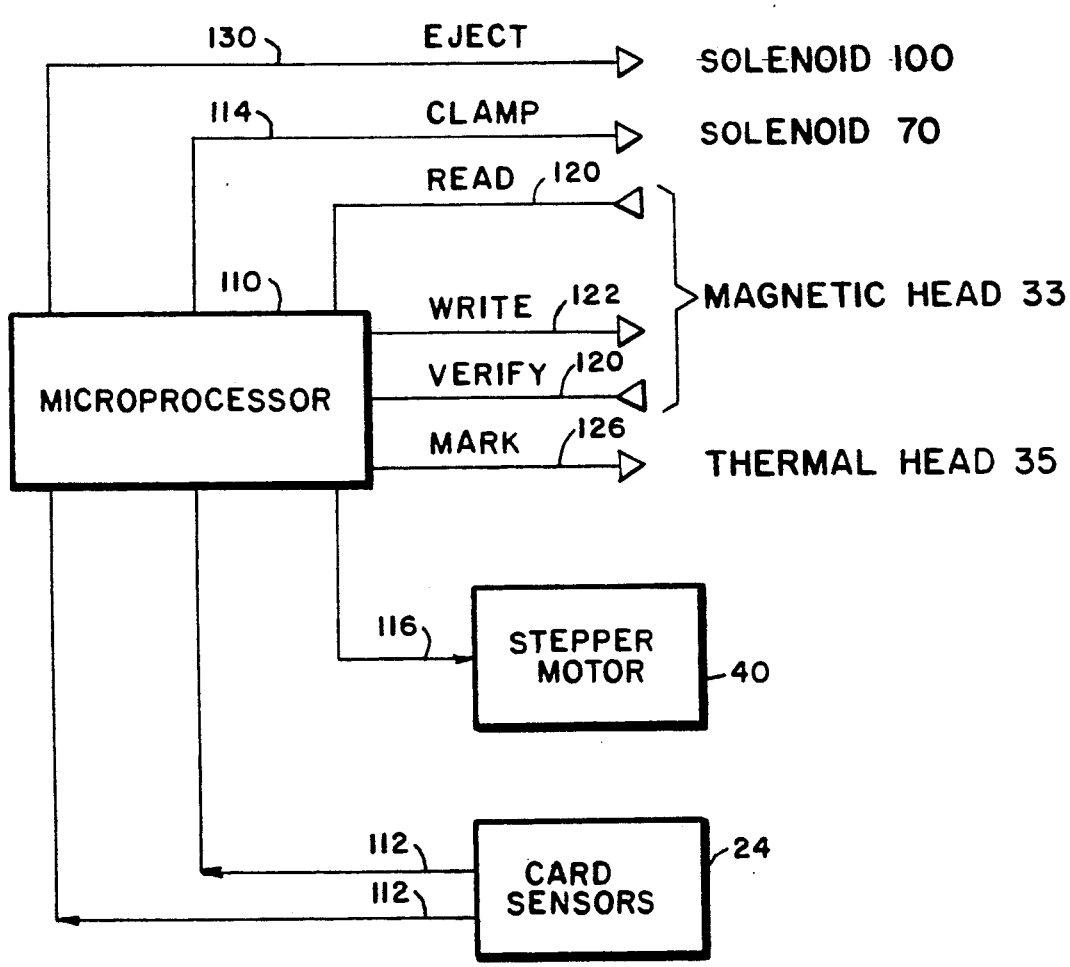
FIG. 8 is a block schematic diagram of the electrical and electronics control system of the present invention that functions to enable the repertoire of card reader operations to be performed.

By referring to FIG. 8, an understanding will be gained of the electrical and electronic aspects of the present invention. Therein a block schematic diagram is presented of the control system of the present invention, which functions to enable the repertoire of card reader operations to be performed.

A microprocessor 110 is at the center of the control system and enables control of all the essential functions. Thus the card sensors previously noted, that is, card sensors 24 situated so as to be at the corners of the fare card when inserted, transmit appropriate signals on connections 112 to the microprocessor to begin the cycle or cycles of operation involved in the reading, writing, and verifying of the data involved with fare card 11.

Upon the sensing of the presence of fare card 11 by card sensors 24, a signal is transmitted on connection 112 to cause the clamping of fare card 11 so that it cannot be removed by the passenger. As already explained, this clamping step results from the operation of solenoid 70, to which a signal is fed on connection 114.

Figure 2:
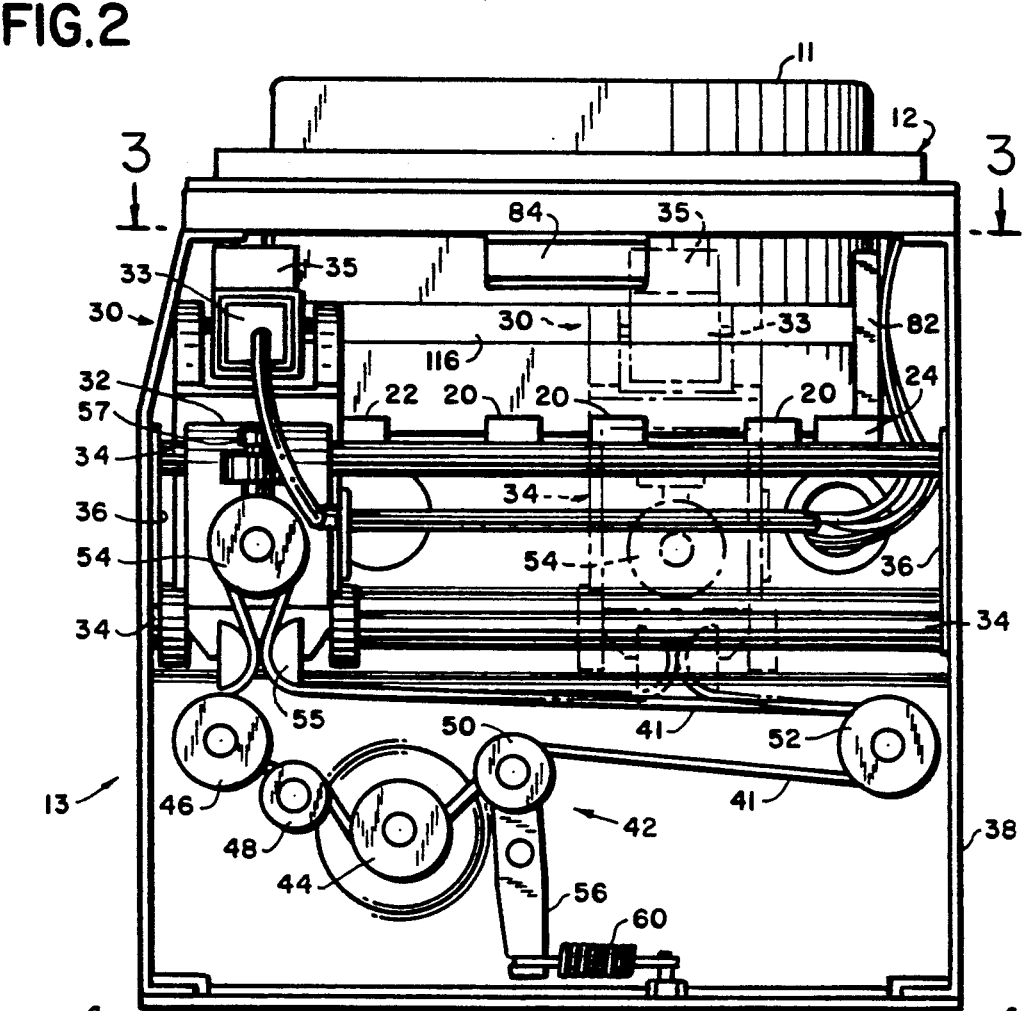
FIG. 2 is a front elevation view of the card reader device, the phantom lines showing the reader head in a position remote from the original or "home" position.
Figure 3:
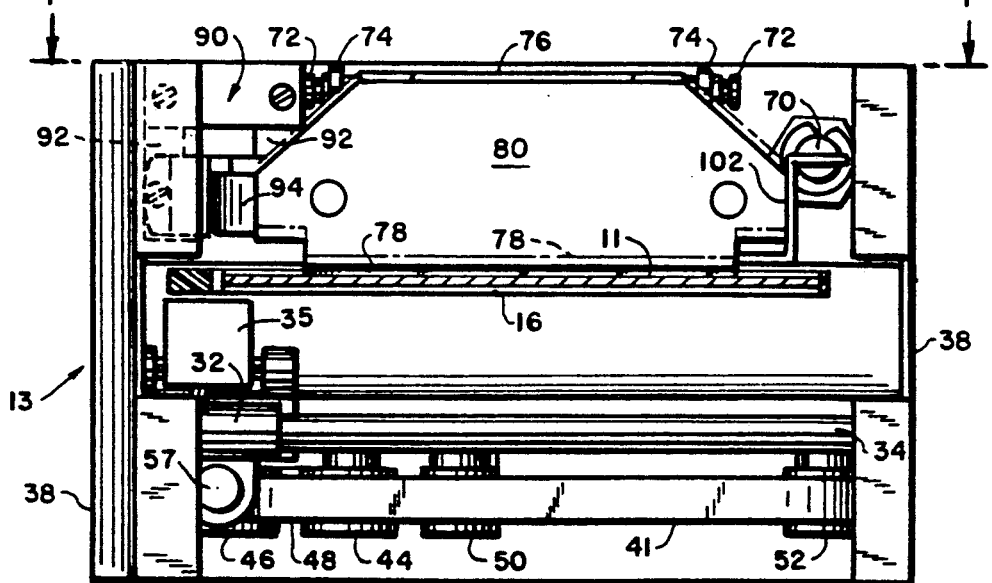
FIG. 3 is a view looking down and is taken on the line 3—3 of FIG. 2.
Figure 4:
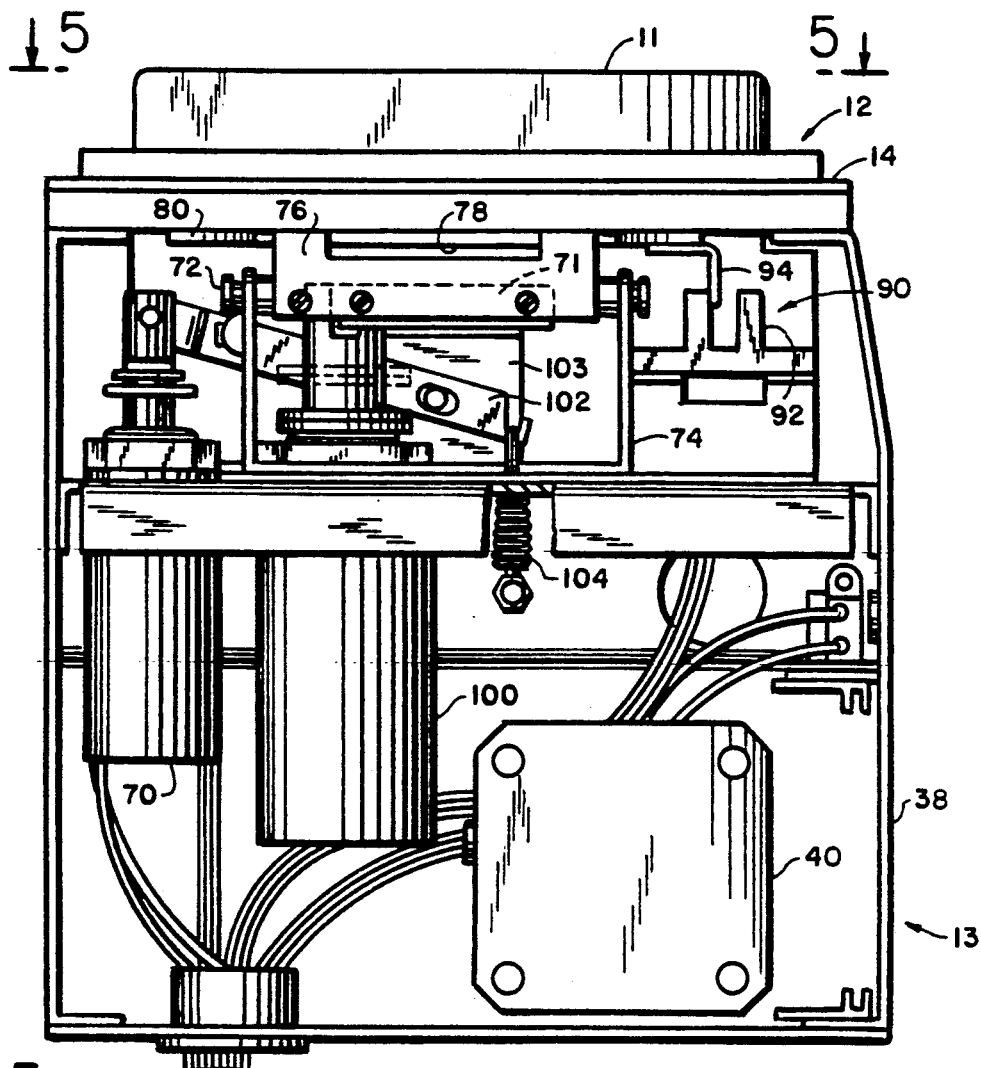
FIG. 4 is a rear elevational view of the card reader device, also showing the fare card in the down position, as was the case in FIG. 2.
Figure 5:
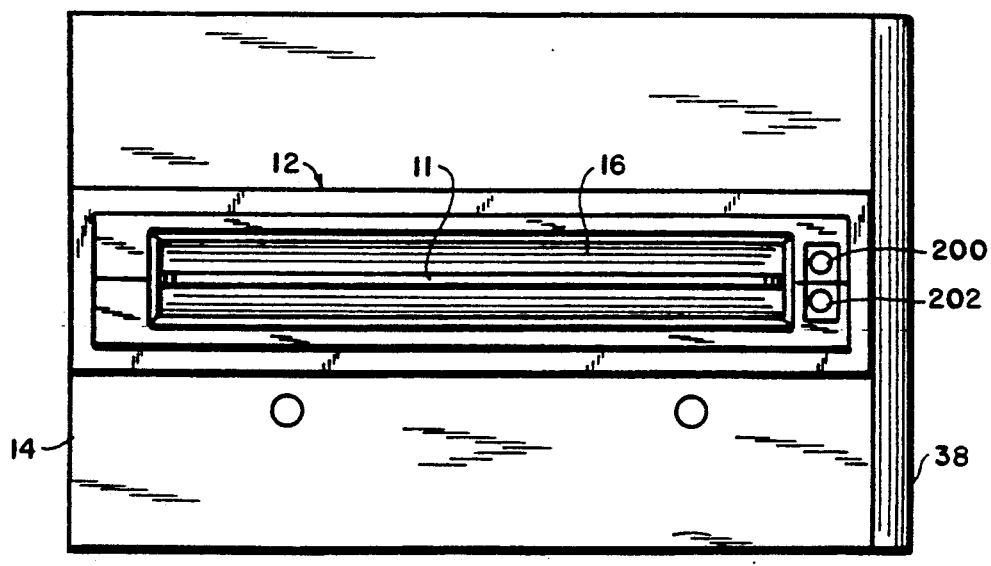
FIG. 5 is a view looking down from the top of the card reader device and taken on the line 5—5 of FIG. 4.
Figure 6:
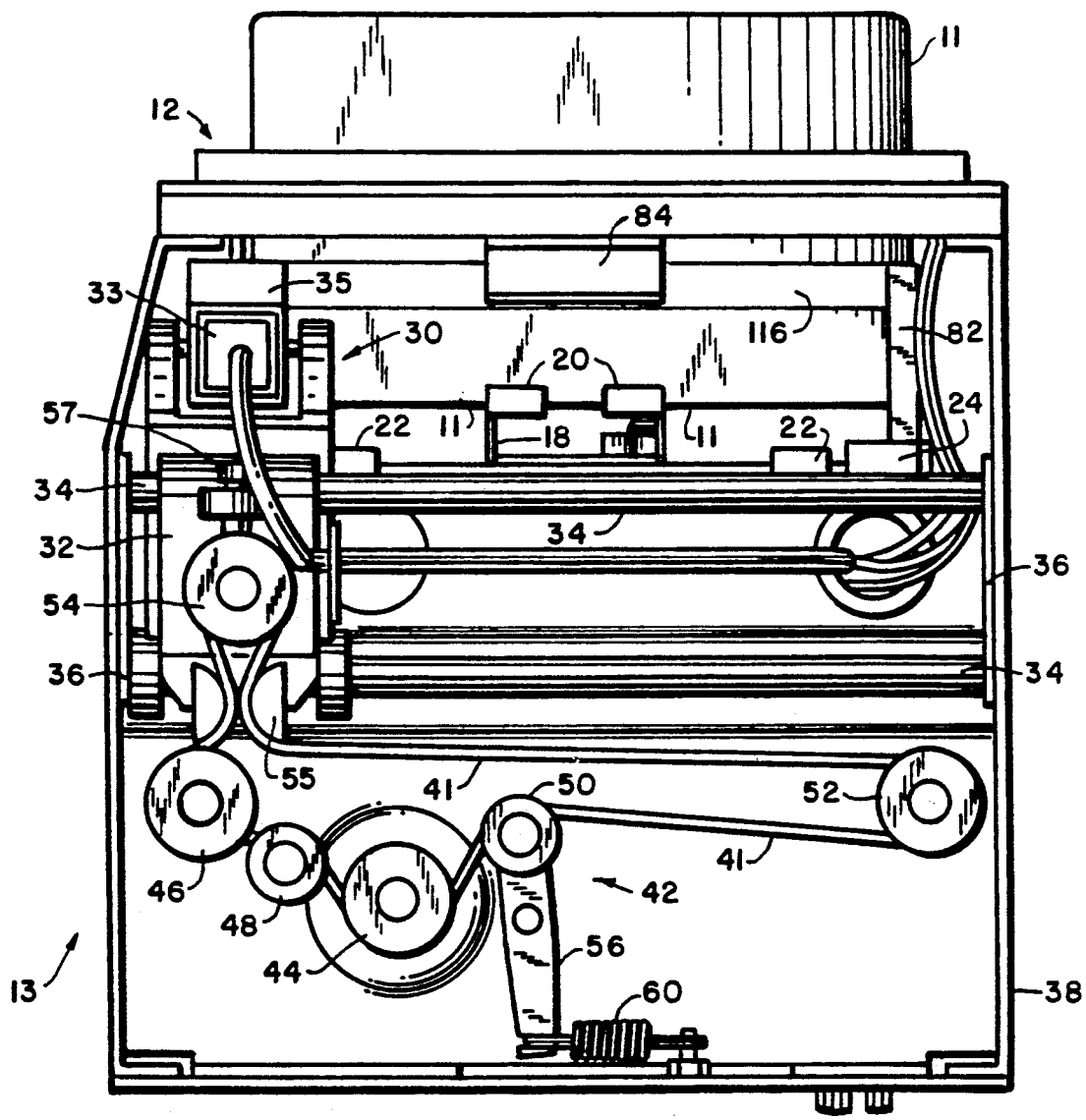
FIG. 6 is a view similar to FIG. 2, that is, a front elevational view with the fare card in the up position.
Figure 7:
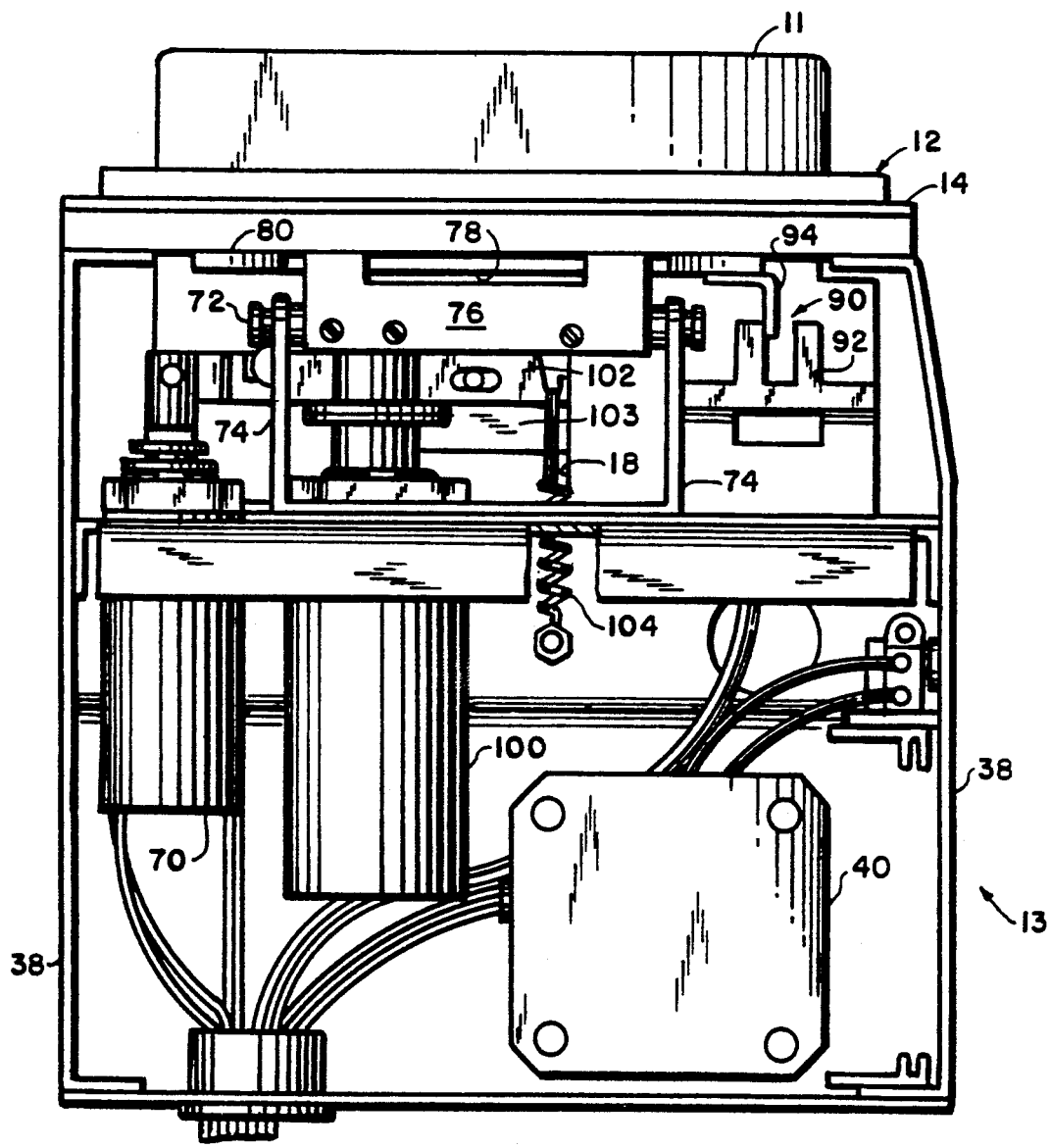
FIG. 7 is a view similar to FIG. 4 but showing the fare card in the up position.

Once the fare card 11 has been so clamped, timed pulse signals on connection 116 in accordance with the programming selected for microprocessor 110 cause the DC stepper motor 40 to move the reader assembly 30 in a forward direction (that is, in a direction from left to right as seen in FIG. 2). This movement of the stepper motor is part of the first cycle to be performed, involving the reading of data that has already been recorded on the magnetic stripe 117 formed on the card 11 seen in FIG. 1.

In a high speed return movement directed by the programming, the stepper motor 40 causes the magnetic reader head 33 to return to its home position (at the far left as seen in FIG. 2). No data operation is performed by the head in this return move as part of the first cycle of operation. In the second cycle, the reader head 33 again moves forward, this time for the purpose of writing data onto the card. This writing operation is preceded by a programmed calculation performed by the microprocessor with respect to the balance still due the passenger in the light of the previous amount read from the card in the reading operation. The new balance is written on the card and is then verified on the return portion of the second cycle, that is, when the head 33 is again moved back to the home position.

The read and write steps are carried out by virtue of the signal connections 120 and 122. Likewise, the verify step is also carried out by means of the same connection 120.

If the optional feature of a thermal head for marking or printing on the card is to be operative, then an appropriate signal is transmitted on the connection 126 to thermal head 35.

Following the read, write, verify, and mark operations, power is removed from the solenoid 70 so that the card is no longer clamped. Furthermore, the card is given a movement upwardly in the eject operation by means of connection 130 to solenoid 100. When actuated, solenoid 100 causes spring biased link 102 to lift the stop mechanism 18, and thereby cause the card to rise in the bezel 12, whence it can be removed by the passenger.

In order that the man skilled in the art may have a detailed set of specifications for construction of the card reader device in accordance with the present invention, the following is provided:

The card reader device 10 may be packaged in a "stand-alone" configuration in which the package includes a power supply and logic boards as well as displays. In connection with displays, it will be noted that red and green lights are provided on the upper face of the bezel as indicated by reference numerals 200 and 202 in FIG. 1. In a stand-alone configuration, no connection is required to a farebox; only a 12 volt DC power source is required.

In an alternate packaging arrangement, device 10 is packaged in a small enclosure which may be mounted to an existing farebox mounted a short distance away. The power and logic would be derived from the farebox by means of cabling from the farebox to the card reader device. Another alternative configuration is to integrate the card reader device 10 into a farebox, using the farebox electronic displays and power supply.

The card reader device 10 is preferably a self-contained unit which will accept a credit card size document (2⅛ inches by 3⅜ inches) of varying thickness (0.007 inches to 0.020 inches), the card being prepared with a magnetic stripe as already noted; and a further stripe containing the heat sensitive materials to be marked as already discussed. The magnetic stripe shall be positioned approximately ⅜ inch (center line) from one edge. The magnetic stripe material shall normally be "low" (300 oersteds) coercivity, with possible provision for installation of a "high" (2,700 to 4,000 oersteds) write head - if the head assemblies are modular. The thermal material shall be white and turn black with the contact of the write head.

It should be noted that when the card 11 is inserted into the housing through the shaped bezel 12, approximately one inch of the card should protrude from the bezel in the fully inserted position. This permits the user to retain a hold on the card while it is being processed. It is noted it is not possible for the card to be completely inserted into the housing 13.

It is a desired objective to have an encoding technique such that it presents a degree of difficulty relative to attempts at fraud or counterfeiting. To this extent, a modification may be made wherein two tracks are provided, each with different information. Further, to the extent practical, these tracks could be skewed to some angle. Moreover, a regular two track ("stereo") write head assembly could be used.

The card reader 10 shall be suitable for operation from a 12 volt DC supply. The stepper motor 40 may, for example, be a VEXTA DC stepping motor manufactured by Oriental Motor Corp. The solenoids 70 and 100, may, for example, be solenoids manufactured by Deltrol Corp. The microprocessor 110 may, for example, be an MP6800 manufactured by Motorola Corp. The card sensors 24 may be those manufactured by TRW Inc.

While there has been shown and described what is considered at present to be the preferred embodiment of the present invention, it will be appreciated by those skilled in the art that modifications of such embodiment may be made. It is therefore desired that the invention not be limited to this embodiment, and it is intended to cover in the appended claims all such modifications as fall within the true spirit and scope of the invention.

We claim:

1. A card reader device comprising:
   (a) a fare card, which contains data, adapted to be inserted into the reader device;
   (b) means for clamping the card in a fixed position automatically responsive to the insertion of the card so that the card may be read and other operations performed with respect to it, said means for clamping including a clamping device and a first solenoid means for forcing said clamping device against said card; a microprocessor, and a first sensor means for sensing the presence of the card at the interior of said card reader and for feeding signals to said microprocessor for energizing said solenoid means;
   (c) a card reader assembly;
   (d) means for moving said card reader assembly past the card to read the data on the card, to write new data and to verify that the new data has been correctly written;
   (e) means for transferring data representative of a fare amount;
   (f) means for automatically releasing the clamping of said card; and
   (g) a second, ejection solenoid means for lifting the card upwardly from said reader device upon release of the clamping of said card.

2. A card reader device as defined in claim 1, in which said card reader assembly further comprises a thermal head, in spaced relationship to, and for movement with, said magnetic head, for marking or printing on said card, said card being supplied with a stripe having material which changes color when heated by said thermal head.

3. A card reader device as defined in claim 1, in which said card includes a magnetic stripe for recording of fare data.

4. A card reader device as defined in claim 1, in which said card reader assembly includes a magnetic reader head, a carriage to which said head is attached, and a pair of rode along which said carriage is transported.

5. A card reader device as defined in claim 4, further comprising a stepper motor, said stepper motor being operable to transport said carriage along said rods.

6. A card reader device as defined in claim 1, in which said microprocessor is operative for performing calculations on data read from said card to obtain new data to be written on said card.

7. A card reader device as defined in claim 6, further comprising means for verifying if the proper new data has been written on said card.

* * * * *